(No Model.)

6 Sheets—Sheet 2.

H. J. HEINZE.
KINETOGRAPHIC CAMERA.

No. 593,376.

Patented Nov. 9, 1897.

Witnesses:
J. M. Fowler Jr.
Thomas Durant

Inventor:
Horatio J. Heinze (No Model.) 6 Sheets—Sheet 3.
H. J. HEINZE.
KINETOGRAPHIC CAMERA.
No. 593,376. Patented Nov. 9, 1897.
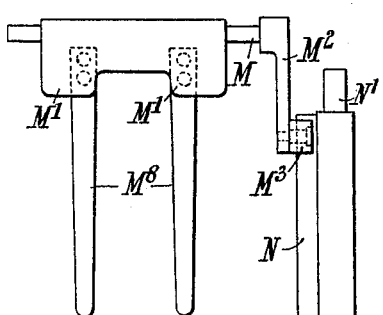
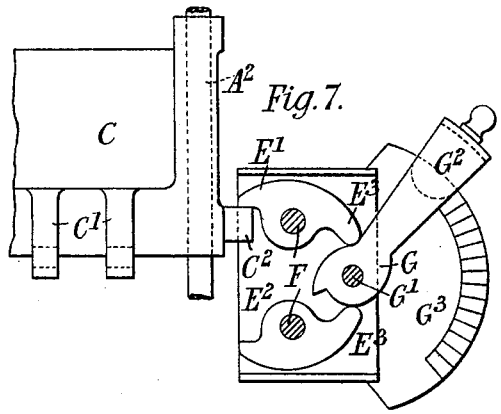
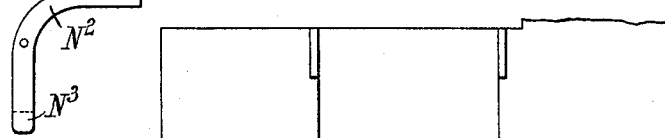
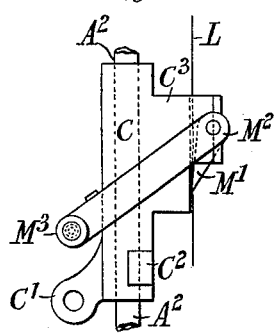
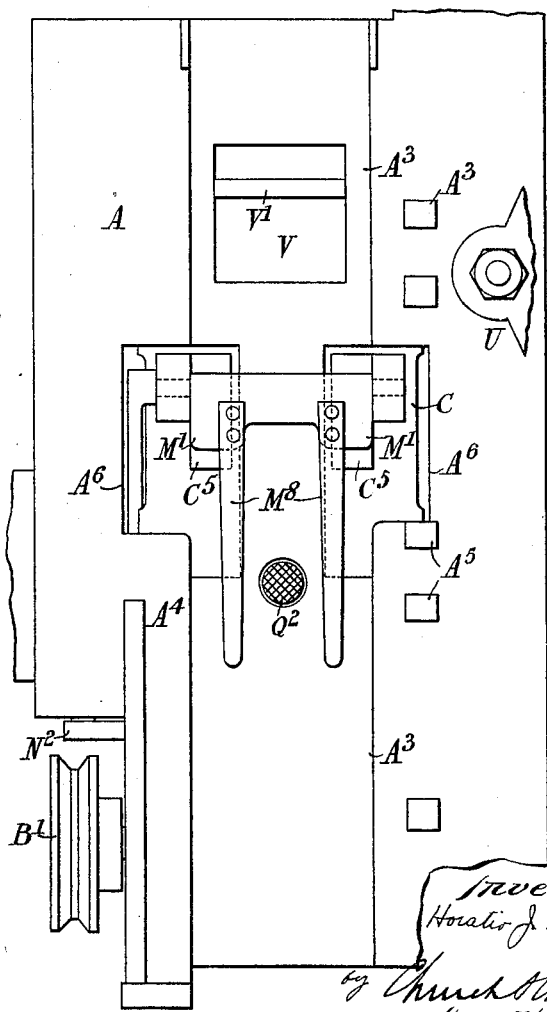
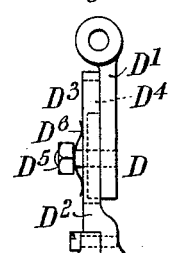

(No Model.) 6 Sheets—Sheet 4.
H. J. HEINZE.
KINETOGRAPHIC CAMERA.
No. 593,376. Patented Nov. 9, 1897.
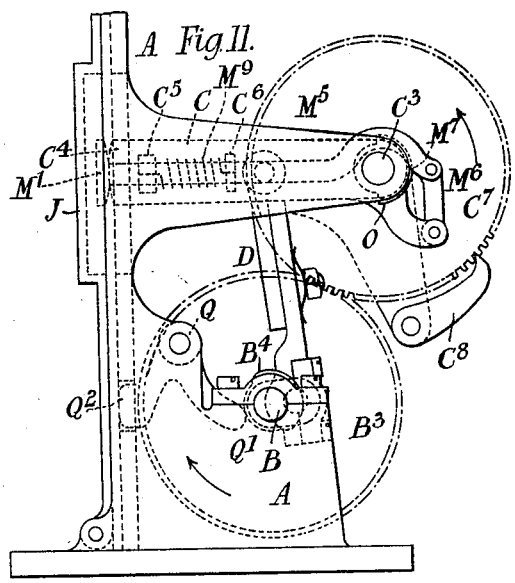
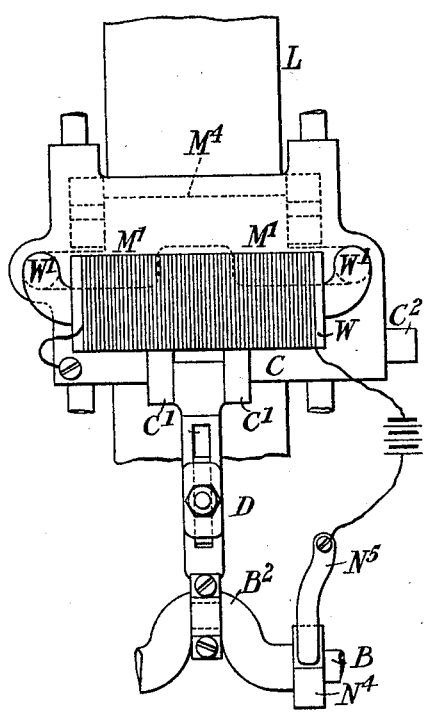
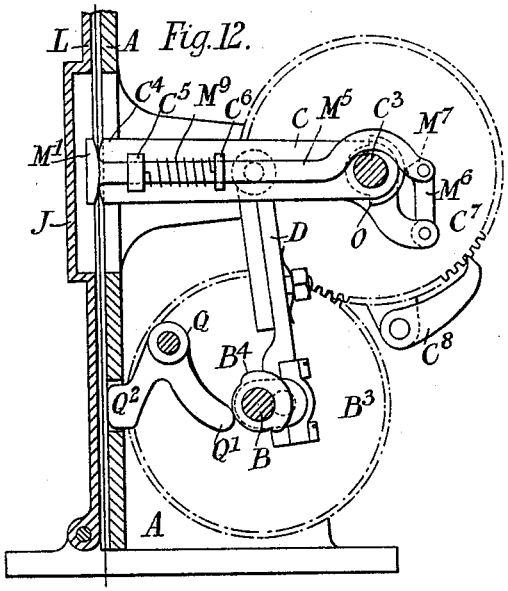
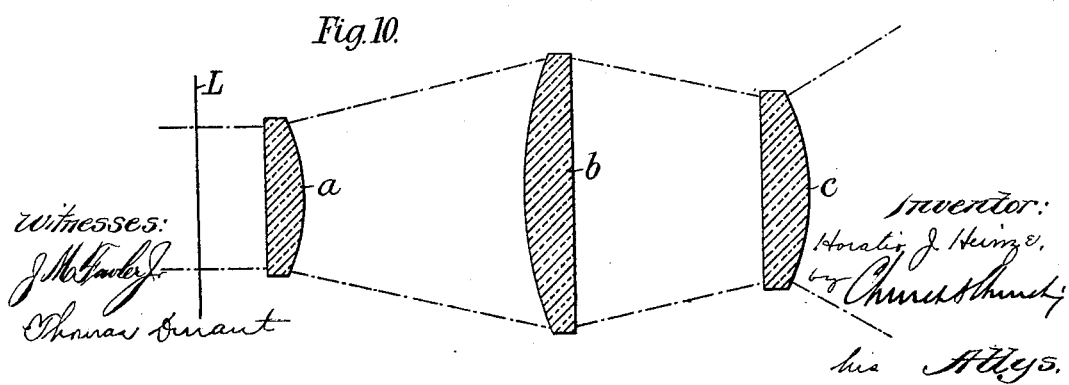

(No Model.) 6 Sheets—Sheet 5.
H. J. HEINZE.
KINETOGRAPHIC CAMERA.
No. 593,376. Patented Nov. 9, 1897.
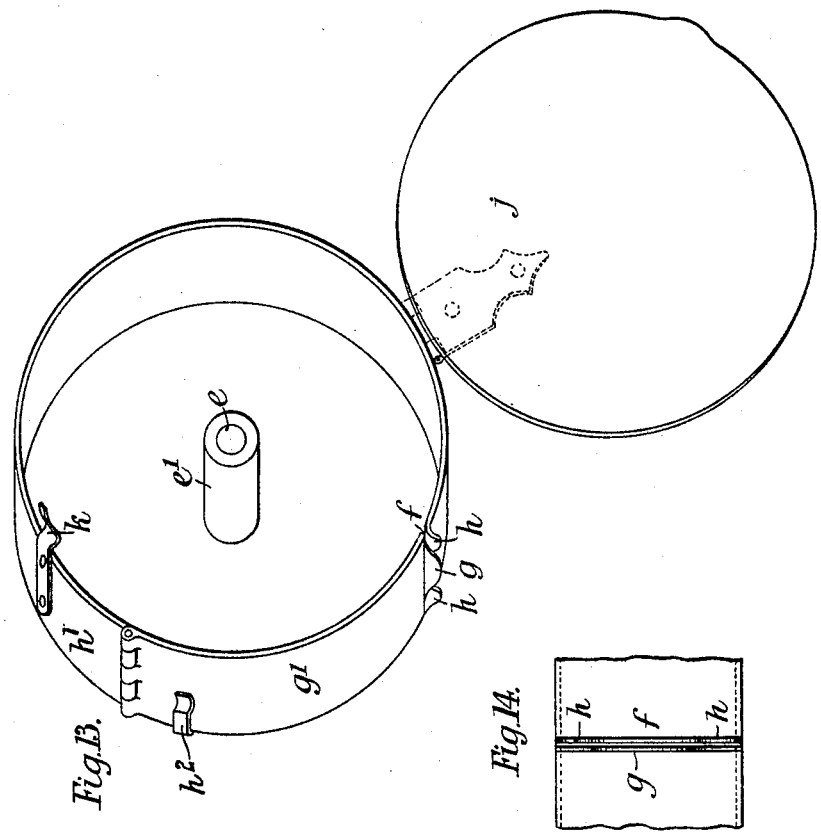

(No Model.)

H. J. HEINZE.
KINETOGRAPHIC CAMERA.

No. 593,376.

6 Sheets—Sheet 6.

Patented Nov. 9, 1897.

Witnesses:
J. M. Fowler Jr.
Thomas Durant

Inventor
Horatio J. Heinze
by Church & Church
his Attorneys

UNITED STATES PATENT OFFICE.

HORATIO JOHN HEINZE, OF LONDON, ENGLAND.

KINETOGRAPHIC CAMERA.

SPECIFICATION forming part of Letters Patent No. 593,376, dated November 9, 1897.

Application filed November 17, 1896. Serial No. 612,509. (No model.)

*To all whom it may concern:*

Be it known that I, HORATIO JOHN HEINZE, a subject of the Queen of England, residing at London, in England, have invented certain new and useful Improvements in Film-Exposing Apparatus, of which the following is a specification.

This invention relates to apparatus for taking photographic pictures of bodies in motion and for exhibiting such pictures, its objects being to enable the pictures in a series each to have any desired length—that is to say, to be spaced at any desired distance from center to center, so that there would be no waste film between them—and to dispense with the perforations which have hitherto been necessary for feeding the film and have inconveniently limited the feed, and therefore the spacing of the pictures, to some multiple of the pitch of the perforations.

In the accompanying drawings certain constructions of the apparatus, according to this invention, are illustrated by way of example.

Figure 1:
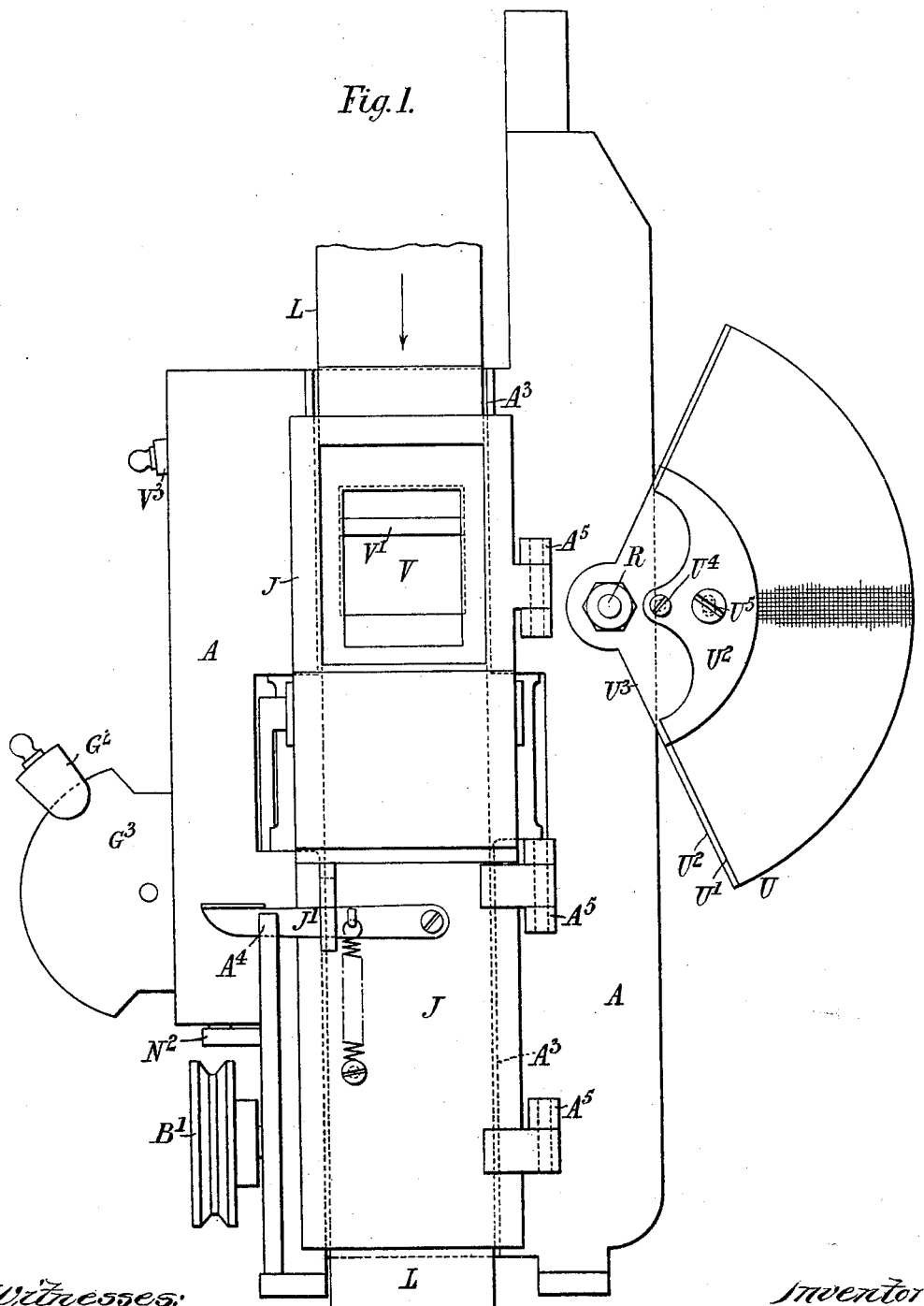
Figure 2:
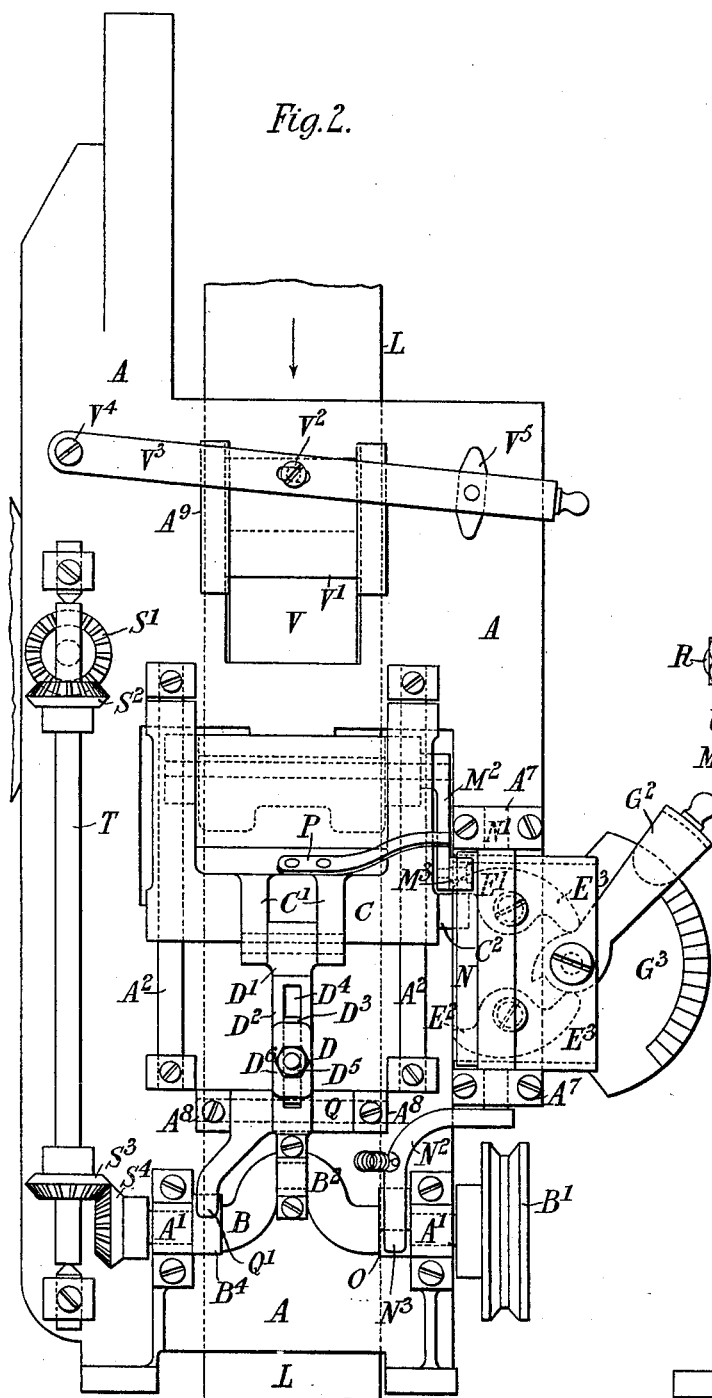
Figure 3:
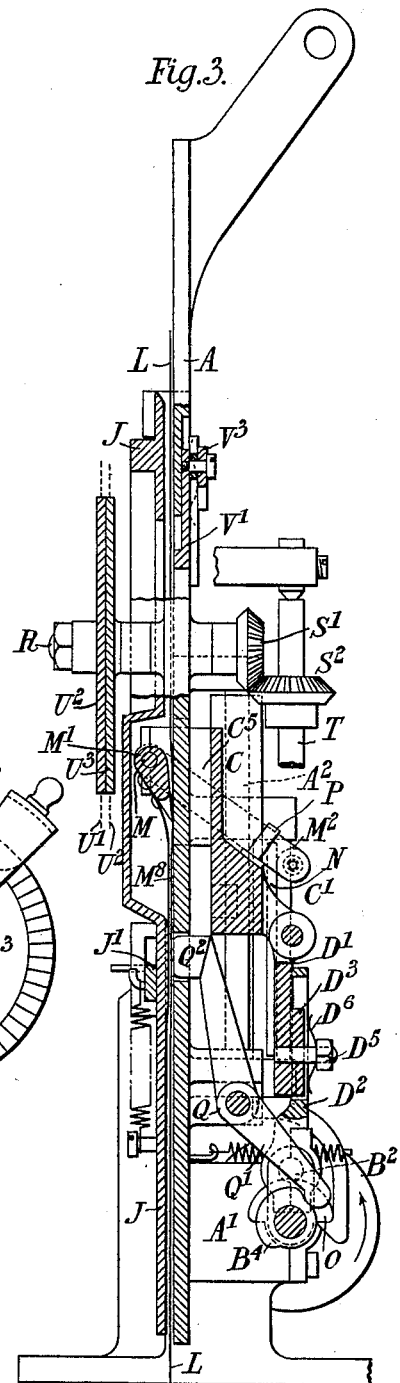
Figure 16:
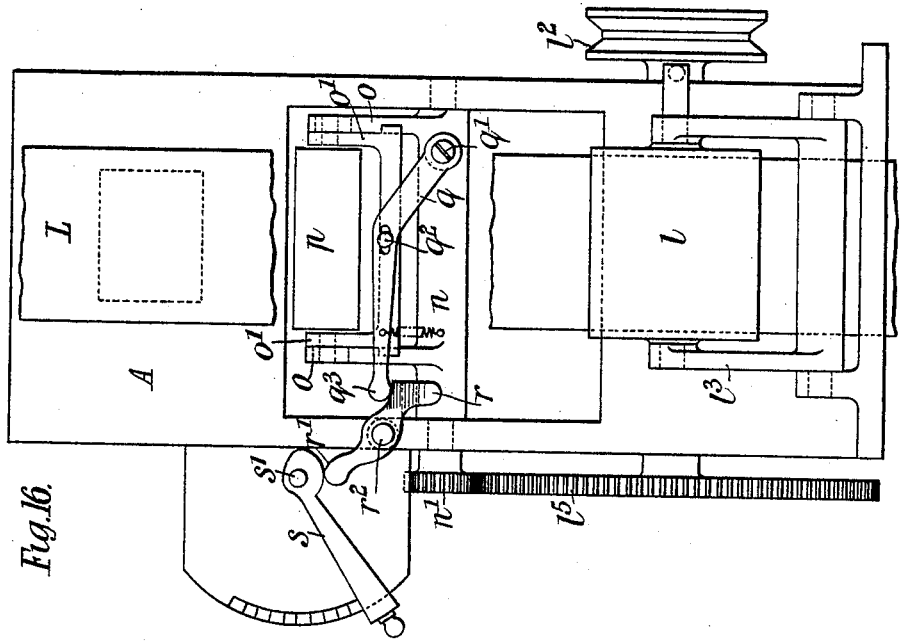
Figure 15:
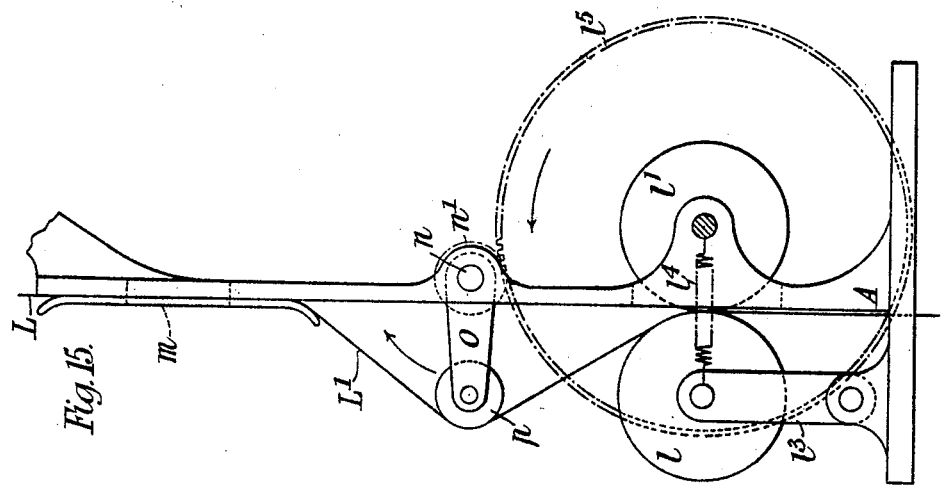

Figure 1 is a front elevation, Fig. 2 a rear elevation, and Fig. 3 a side elevation, partly in section, of one construction of my improved film-exposing apparatus. Fig. 4 is a detail view showing the film-grippers hereinafter referred to together with portions of the apparatus by which they are controlled. Fig. 5 is a side elevation of the film-feeding device C, which forms part of Fig. 2, showing this part in a position at right angles to that in which it is shown in the said Fig. 2. Fig. 6 is a side elevation of a yielding rod hereinafter referred to as a detail of Figs. 2 and 3. Fig. 7 is an elevation showing the means by which travel of the film-feeding device can be regulated while the apparatus is in use for the purposes of varying the feed, as may be desired. Fig. 8 is a front elevation of a part of the apparatus, a portion being removed to show the film-gripping devices. Fig. 9 is an elevation of an alternative construction of a part of a machine such as is shown in Figs. 1, 2, and 3, for the purpose of enabling the film-grippers to be controlled electrically. Fig. 10 illustrates diagrammatically in side elevation an arrangement of lenses suited for use with projection apparatus of the class hereinafter referred to. Fig. 11 is a side elevation, and Fig. 12 a vertical central section, of an alternative construction of a film-exposing apparatus according to this invention in which an oscillatory film-feeding device is employed. Fig. 13 is a perspective view of a box for containing a coil of film-feeding device for the film-exposing apparatus; and Fig. 14 is an exterior view of part of the film-box, showing the opening through which the film issues. Figs. 15 and 16 are respectively a side and rear elevation of a further alternative construction of film-exposing apparatus according to this invention.

With reference, first, to Figs. 1 to 7, A is a support or main frame provided with bearings A', in which is journaled a main shaft B, provided with a belt-pulley B' or other convenient means whereby rapid rotation may be imparted to it. C is a film-feeding device which in this instance is a block arranged to reciprocate upon guide-rods A², fixed parallel to the rear face of the support A. D is a yielding rod which at one end is connected by a pin connection to the lugs C' on the film-feeding device C and at the other end engages the pin of a crank B², formed on the main shaft B. This yielding rod is made in two main parts D' and D², which lie one upon another, as shown in Fig. 6, a block D³, carrying a stud, extending from the part D' through a slot D⁴ in the part D², so as to carry a nut D⁵, between which and the part D² a spring D⁶ is held in compression. The spring operates to maintain sufficient friction between the meeting faces of the opposed parts D' D² to prevent them from sliding endwise upon one another, so as to lengthen or shorten the rod, except when the film-feeding device C is stopped in the manner hereinafter described at the ends of its path of travel—that is to say, the spring operates to set up sufficient resistance to prevent alteration of the length of the rod while the latter is moving the film-feeding device C between stops.

The stops just referred to are shown clearly in Fig. 7, from which may be seen that the film-feeding device C is provided with an extension C², integral therewith, E' E² being stops, each mounted on a pivot F, fixed on the support or main frame A. These stops are double-ended, the ends E³ of each bearing upon a double cam D, pivoted by a pin G' to the support A and provided with a lever G², by which it can be adjusted to bring the ends of the stops which protrude into the path of the projection C² nearer together or farther apart, as required. G³ is a graduated plate in proximity to the lever G², to indicate the extent to which it is adjusted.

The film-guide is constituted in part by one face of the support A, which is grooved, as at A³, and in part by a door J, which lies across the groove, as shown in Fig. 1, there being sufficient clearance between the opposed faces of the door and the groove A³ to permit the free passage of the film L through the apparatus from top to bottom in the direction of its length, as indicated by the arrow in Fig. 1. J' is a spring-latch pivoted to the door J and engaging normally with a keeper A⁴, so as to keep the groove A³ closed. A⁵ are hinges about which the door can readily be turned when it is desired to insert a film into the groove A³.

The film-grippers, by which the film placed in the film-guide, as indicated in Fig. 1, is caused to receive intermittent movement in the direction of the arrow, will now be described. Portions C⁵ of the film-feeding device C, which is at the opposite side of the support A to that upon which the film travels, extend through slots A⁶ in the said support to and beyond the level of the surface over which the film passes. The parts extended beyond the level of that surface have pivoted in them a transverse shaft M, (see also Fig. 4,) upon which are secured fingers M'. Between those portions of the film-feeding device which are in the film-guide and the shaft M and fingers M' there exists normally a passage just sufficient to enable the film to pass; but when the fingers M' are moved against the adjacent portions of the film-feeding device in the manner hereinafter described they grip the film in the clearance, and if the film-feeding device then be moved the fingers M' and feeding device C will carry with them the film. Spring extensions M⁸ are fixed to the fingers M' and extend therefrom in the direction in which the film is to be moved by the fingers lying close to the opposed surface of the film-guide in order to prevent any buckling of the film therein during each feed movement thereof. In the example illustrated this movement of the film in company with the film-feeding device occurs during the downward movement of the latter. During the reverse or upward movement the fingers M' are caused to move away from the film-feeding device sufficiently far to pass freely over the film without exerting any propulsive effect thereon.

Upon one end of the shaft M is an arm M², which at one end carries an antifriction-roller M³. In proximity to the path traversed by the roller M³ in its movement with the arm M² and the rest of the apparatus carried by the film-feeding device is a bar N, which is carried by a shaft N', the latter being pivoted to turn in bearings A⁷, fixed to the support or main frame A and being provided with an arm N², which at the end N³ engages with a cam O, fixed upon the main shaft B. By the operation of the cam the plate N can be moved toward or away from the support or main frame A, so as by acting on the roller M³ to raise or lower the arm M², as required, no matter where the roller may happen to be in its path of reciprocation with the device C.

P is a spring fixed upon the film-feeding device C and bearing the arm M², so as to keep it and the parts N N² O in constant engagement and up to their work.

Preferably the apparatus is provided with a brake in the form of a detent-lever Q, pivoted in bearings A⁸ to the support A and having one end Q' engaged with the cam B⁴, fixed on the main shaft B, and the other end Q² extended into the film-guide. The cam B⁴ is so disposed in relation to the lever Q that the end Q² of the latter keeps the film pressed against the door J of the film-guide at all times except those at which the film is required to move with the descending film-feeding device C.

The shutter employed with this apparatus is a rotating one fixed upon the shaft R, which latter is geared by the gear-wheels S' S² S³ S⁴ to the main shaft B by way of the intermediate shaft T, as shown. The shutter U (see Fig. 1) is mainly composed of two thicknesses U' U² of wire-gauze, one thickness U² being fixed to the plate U³, which in turn is fixed to the shaft R, and the other thickness U' being fixed to the plate U², which is adjustable upon the plate U³, being pivoted thereto at U⁴. U⁵ is the head of a screw which passes through the plates U² U³, so as to lock the two thicknesses of wire-gauze U' U² in any position to which they may be adjusted in relation to each other. By moving one thickness upon the other it is possible to vary the amount of light obstructed by the shutter from a minimum (which will be obtained when the wires of the two thicknesses are exactly superposed) to a maximum, which will be obtained when the wires of the one thickness of fabric lie opposite the interstices of the other thickness. It is found advantageous to be able to vary the amount of light obstructed in this manner, for which a series of faint pictures upon the film is sufficient to obscure the latter during the change of pictures without absolutely blotting it out, such obscuration producing a less-unpleasant effect upon the observer than the occurrence of a complete eclipse after each exposure, and by varying the amount of light obscured the degree of obscuration can be proportioned to the density of the pictures being shown.

V is the opening in the support through which the film is exposed in its passage through the apparatus.

V' is a shutter. This shutter is arranged to slide in guides A⁹ and is connected by a pin-and-slot connection at $V^2$ to a lever $V^3$, pivoted at $V^4$ to the support A and provided at its opposite end with a spring $V^5$, fixed to the lever and in compression between it and the adjacent face of the support, so that it will set up sufficient friction to return the lever in any position to which it may be adjusted. By moving the lever $V^3$ up or down the shutter $V'$ is correspondingly adjusted in the aperture V, whereby the latter is varied in size.

The operation of the apparatus hereinbefore described is as follows: The door J is opened to permit of the insertion of one end of a strip of film L in the groove $A^3$ and between the fingers $M'$, shaft M, and film-feeding device C, after which the doors are reclosed. The main shaft B is then rotated and imparts, by means of the yielding rod D, a reciprocating movement to the film-feeding device C upon the guide-rods $A^2$. Simultaneously the cam O operates the lever $N^2$, plate N, roller $M^3$, and arm $M^2$ at proper intervals in such a manner that during the descent of the film-feeding device C the grippers grip the film, pressing the film against it and causing it to move down, whereas in the ascent of the film-feeding device the cam O releases the mechanism $N^2$ N $M^3$ $M^2$, and allows the spring P by its action upon the arm $M^2$ to move and keep the grippers away from the film until the next descent of the feeding device. The cam $B^4$, acting on the brake-lever Q, is so set in relation to the cam O that at all times when the latter is not causing the grippers to grip the film and feed it the brake $Q^2$ will grip the film and hold it stationary. In other words, during the descent of the device C the grippers are operative and the brake is inoperative, and conversely during the ascent of the device C the brake is operative and the grippers are inoperative. The main shaft B, in addition to feeding and braking the film, as described, revolves the shutter R by means of the gearing $S'$ $S^2$ $S^3$ $S^4$, before referred to. The shutter is so set on the shaft and is of such angular extent as to cover the opening V, at which the exposure occurs, except at such times as the film is stationary.

Variation of the extent of movement given to the film at each operation of the feeding device is one of the most important advantages obtainable by this invention, because it enables perforations in the films to be entirely dispensed with. This is effected by varying the extent of travel of the film-feeding device C in the following manner: The stops $E'$ $E^2$, Fig. 7, are adjusted so as to limit the travel of the device C by coming into contact with the projection $C^2$ therefrom, and they are enabled thus to limit the movement of the device C, inasmuch as the connection between the latter and the main shaft B is made yielding and in the illustrated example takes the form of the yielding connecting-rod D, hereinbefore described. The throw of the crank $B^2$ is such that it will impart the desired maximum travel to the device C if the stops $E'$ $E^2$ are not in action, whereas if the stops $E'$ $E^2$ be brought into action they will stop the motion of the device C at the desired points without affecting the crank-shaft, which, when the moving of the feeding device is thus interfered with, will either lengthen or shorten the rod O, as the case may be.

With reference now to Fig. 9, which illustrates a modification of the apparatus in which electricity is employed to actuate the fingers $M'$ of the film-gripper, the carriage C has an electromagnet W secured upon it, the poles $W'$ of which extend into proximity to a pivoted armature $M^4$, upon which fingers $M'$ are provided. $N^4$ is a contact-maker fixed upon the main shaft B, and $N^5$ is a spring-contact included in a battery-circuit in which the electromagnet W is comprised. The contact-maker is so arranged as to complete the circuit of the electromagnet at proper intervals for the period during which the reciprocating film-feeding device traverses its downward path, thus causing the armature $M^4$ to approach the poles $W'$ and the grippers attached to that armature to engage the film. The contact-maker $N^4$ makes contact with the spring $N^5$ to cause the electromagnet W to be energized at intervals and periods corresponding to those at which the arms $N^2$ of Fig. 2 is actuated by the cam O in the same figure.

With reference to Fig. 10, $a$ $b$ $c$ are three plano-convex lenses, which are intended to be disposed, as shown, with the smaller lens $a$ close to the film L, so that it may receive upon its plane face the rays projected through the film and project an enlarged image upon the convex face of the lens $b$, which in turn will deliver a reduced image upon $c$, the latter effecting the final enlargement to the desired extent. The advantages of this arrangement are that the lenses $b$ and $c$, which are such as are ordinarily used for lantern projection, are rendered equally available for use with the small pictures on a film by the insertion of the lens $a$ between the lens $b$ and the film to magnify the picture to a size which will enable the lens $b$ to deal with it. Otherwise the lenses $b$ and $c$ could not be used for projection from film, and a distinct optical equipment would be needed.

The modification illustrated in Figs. 11 and 12 will now be described. It comprises a support A, in which a film-feeding device C is pivoted, so as to oscillate instead of reciprocating, as does the corresponding part in the construction previously described. $C^3$ is a shaft journaled in a part of the support A, about which shaft the device C oscillates, being caused to do so by a yielding connecting-rod D, operated from a main shaft B in like manner to the operation of the correspondingly-lettered parts in the preceding figures. In the oscillation of this form of the film-feeding device C the end C⁴ thereof, Fig. 12, which is farthest from the shaft C³, moves up and down behind the film L in the arc of a circle, which being very short approximates sufficiently to a straight-line path for the purpose of this invention. M' are grippers carried upon the oscillating device C and so formed as to extend to the front of the film and grip the latter between them and the adjacent face of the device C during the downward movement of the latter. The grippers are carried upon rods M⁵, which slide endwise in guides C⁵ on the feeding device C and are extended beyond the shaft C³ for connection to a link M⁶, pivoted to the device C and being suitably shaped, as at M⁷, to bear against a cam O, fixed on the auxiliary shaft C³, which operates the grippers at the proper time. M⁹ is a spring in tension between a collar C⁶ on the rod M⁵ and the guide C⁵, through which it passes. It serves to keep the rod M⁵ and link M⁶ in a position in which the latter will be always in readiness for operation by the cam O. The main shaft B and auxiliary shaft C³ are geared together by the spur-wheels B³ C⁷. C⁸ is a pawl pivoted to the support A, so as to engage with the teeth of the wheel C⁷ to prevent the gear from being turned in the wrong direction. The door J for the film-guides is pivoted by its lower edge to the support A instead of at one side in this construction.

Fig. 13 illustrates the supply-box, from which the film is delivered. It contains a central spindle e, provided with a roller e', around which the film is wound, and is slotted, as at f, to enable the film to issue. At the opposite sides of the slot are lips g and h, as shown, to bear upon the film at each side of the way by which it issues, the lip g bearing on the center of the film and the lips h bearing on the sides thereof. The portion g' of the wall of the box, of which the lip g forms part, is hinged to the portion h' of the wall and forced inward by a spring h², secured to the back of the box, so that the lip g tends always to close the aperture f, and thus maintains a slight amount of tension in the issuing film. j is the hinged lid of the box. k is a spring-catch to keep the lid closed.

In the further modification illustrated in Fig. 15 and 16 the film L is drawn downward continuously by friction-rollers l l', situated in the lower part of the apparatus, the roller l' being pivoted to the support A and driven by the pulley l², keyed onto the spindle, while the roller l is journaled in a swing-frame l³, pivoted to the support A, being caused to grip the film between it and the other roller by a spring l⁴ in tension between the swing-frame and the support. m is a plate so situated relatively to the support A as to leave a narrow passage-way between the two for the film L in order that a certain amount of drag or retardation may be exerted on the film as it passes through such passage. Between the lower end of the plate m and the rollers l l' is journaled a shaft n, geared by the pinion n', fixed upon it to a spur-wheel l⁵, fixed upon the shaft of the roller l'. On the shaft n is fixed a frame o, which carries a roller p, the radial distance of which from the center of the shaft n can be varied. The object of this roller p, placed eccentrically to the shaft n, is to produce in its rotation about the latter a loop or deviation L' in the film L at intervals. The rollers l l' tend always to keep the film in a straight line between the bottom of the plate m and the rollers l l', but the roller p comes around at regular intervals with the frame o to bulge the film out in the manner indicated in Fig. 15, and inasmuch as the rollers l l' are prevented by ratchet or equivalent means (not shown in the drawings) from allowing the film to return upward the production of the bulge or deviation L' draws the film sharply down between the plate m and the support A, and thus effects the rapid movement necessary for the change of picture. As soon as the roller p recedes from the loop or deviation L', leaving it slack, such slackness is taken up by the rollers l l', which rotate continuously and at uniform speed, and thus make the film taut in readiness for the next operation of the roller p. The amount of feed imparted by the roller p acting as aforesaid will depend upon its distance from the axis of the shaft n, about which it rotates, and to vary the feed this distance may be varied by the mechanism now to be described. The roller p is not journaled directly in the frame o but in a frame o', Fig. 16, which is movable in guides in the frame o by means of the lever q, pivoted at q' to the said frame O and connected at q² by a pin-and-slot connection to the frame o. The end q³ of this lever q bears upon a cam r, which lies in the path in which the end q³ of the lever q travels in its movement with the rotating frame o. This cam r forms part of a lever r', pivoted at r² to the frame A of the apparatus, and controlled by an adjusting-lever s, pivoted at s' to the said support. Adjustment of the lever s varies the distance of the cam r and consequently of the end q³ of the lever q from the axis of rotation of the frame o and proportionately varies the distance of the frame o' and its roller p from the same axis of rotation, thus altering to the desired degree the size of the loop L' and the extent of the feed of the film.

I claim—

1. In a film-exposing apparatus, the combination with the support, of a main shaft, a film-feeding device, a rod operatively connecting the main shaft with the feeding device, a film-guide, grippers on the feeding device adapted to intermittingly grip the film between them and that device, and gearing operatively connecting the grippers and the main shaft; substantially as described.

2. In a film-exposing apparatus, the combination with the support, the main shaft, the reciprocating film-feeding device, the yielding rod operatively connecting the main shaft with the feeding device, a film-guide, grippers on the feeding device adapted to grip the film between them and that device in its descent, cam-controlled gear operatively connecting the grippers and the main shaft, and the spring carried by the film-feeding device adapted to keep the grippers away from the film during the return movement of the feeding device; substantially as described.

3. In a film-exposing apparatus the combination with a support A, of a main shaft, a reciprocating film-feeding device, a yielding rod operatively connecting the main shaft with the feeding device, adjustable stops in the path of the feeding device, a film-guide, film-grippers supported on the feeding device and adapted to intermittently grip the film between them and that device elastic extension on the grippers, an arm in operative connection with the film-grippers a pivoted bar whereon the arm slides, a cam in operative connection with the pivoted slide-bar, a brake in the film-guide operatively connected with the main shaft by mechanism adapted to operate intermittently, a perforated rotatable shutter, gearing connecting the shutter and main shaft, and an adjustable shutter V' substantially as set forth.

4. In a film-exposing apparatus the combination with a support A, of a main shaft, a reciprocating film-feeding device, a yielding rod operatively connecting the main shaft with the feeding device, adjustable stops in the path of the feeding device, a film, guide, film-grippers supported on the feeding device and adapted to intermittently grip the film between them and that device, an arm in operative connection with the film-grippers, a pivoted bar whereon the arm slides, a cam in operative connection with the pivoted slide-bar, a brake in the film-guide operatively connected with the main shaft by mechanism adapted to operate intermittently, a perforated rotatable shutter, and gearing connecting the shutter and main shaft substantially as set forth.

5. In a film-exposing apparatus the combination with a support A, of a main shaft, a reciprocating film-feeding device, a yielding rod operatively connecting the main shaft with the feeding device, and adjustable stops in the path of the feeding device, substantially as set forth.

6. In a film-exposing apparatus the combination with a support A, of a main shaft, a reciprocating film-feeding device, a yielding rod operatively connecting the main shaft with the feeding device, adjustable stops in the path of the feeding device, a film-guide, grippers on the feeding device adapted to intermittently grip the film between them and that device and cam-controlled gear operatively connecting the grippers and the main shaft substantially as set forth.

7. In a film-exposing apparatus the combination with a support A, of a main shaft, a reciprocating film-feeding device, a yielding rod operatively connecting the main shaft with the feeding device, adjustable stops in the path of the feeding device, a film-guide, film-grippers supported on the feeding device and adapted to intermittently grip the film between them and that device, a brake in the film-guide and cam-controlled gear operatively connecting the grippers and brake with the main shaft, substantially as set forth.

8. In a film-exposing apparatus the combination with a reciprocating film-feeding device, of film-grippers supported on that device and adapted to intermittently press the film against the said device, an arm in operative connection with the film-grippers, a cam in operative connection with the arm and main shaft whereon that cam is fixed, substantially as set forth.

9. In a film-exposing apparatus the combination with a reciprocating film-feeding device, of film-grippers supported on that device and adapted to intermittently press the film against said device, elastic extensions on the grippers, an arm in operative connection with the film-grippers, a cam in operative connection with the arm and a main shaft whereon that cam is fixed, substantially as set forth.

10. In a film-exposing apparatus the combination with a reciprocating film-feeding device of film-grippers supported on that device and adapted to intermittently press the film against said device, an arm in operative connection with the film-grippers, a pivoted bar whereon the arm slides, a cam in operative connection with the pivoted bar and a main shaft whereon the cam is fixed, substantially as set forth.

11. In a film-exposing device a yielding connecting-rod comprising two parts $D'$ $D^2$ adapted to slide one upon the other, a block $D^3$ extending from one part through a slot in the other, a nut $D^5$ and spring $D^6$, substantially as set forth.

12. In a film-exposing apparatus the combination with a reciprocating film-feeding device E of pivoted stops $E'$ $E^2$ and adjusting-cam G to adjust the two stops simultaneously, substantially as set forth.

13. In a film-exposing apparatus the combination with a main shaft of a shutter-shaft R and a shutter U comprising layers $N'$ $U^2$ of perforated material adjustable relatively to each other in the shutter, substantially as set forth.

14. In a film-exposing apparatus the combination with a reciprocating film-feeding device C and grippers M' of electromagnetic apparatus W $M^4$ $N^4$ $N^5$ for controlling the grippers, substantially as set forth.

15. In a film-exposing apparatus the combination with a support A having an exposure-opening, of a lever $V^3$ spring $V^5$ and frame V' substantially as set forth.

16. In a film-exposing apparatus the combination with a support A of friction feeding-rollers I I' a retarding device M and a rotating frame n carrying a roller p whose distance from the axis of rotation is adjustable by cam-operated mechanism substantially as set forth.

17. In a film-box the combination with the wall formed in two parts, $h'$, $g'$, hinged together as shown, the lips $h\ h$ formed on the part $h'$, the lip $g$ formed on the part $g'$, and the spring for pressing the portion $g'$ of the wall inward; substantially as described.

In witness whereof I have hereto set my hand in the presence of the two subscribing witnesses.

HORATIO JOHN HEINZE.

Witnesses:
HAROLD WADE,
WM. JNO. TENNANT.